United States Patent
Yoshikawa et al.

(10) Patent No.: US 11,768,120 B2
(45) Date of Patent: Sep. 26, 2023

(54) DIAPHRAGM VACUUM GAUGE WITH DECREASED PARASITIC CAPACITANCE

(71) Applicant: AZBIL CORPORATION, Tokyo (JP)

(72) Inventors: Yasuhide Yoshikawa, Chiyoda-ku (JP); Keisuke Obara, Chiyoda-ku (JP); Jun Ichihara, Chiyoda-ku (JP); Kimihiro Sato, Chiyoda-ku (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 17/744,036

(22) Filed: May 13, 2022

(65) Prior Publication Data

US 2022/0364942 A1    Nov. 17, 2022

(30) Foreign Application Priority Data

May 17, 2021    (JP) .................................. 2021-083125

(51) Int. Cl.
*G01L 9/00*    (2006.01)
*G01L 21/00*    (2006.01)

(52) U.S. Cl.
CPC ............ *G01L 9/0072* (2013.01); *G01L 21/00* (2013.01)

(58) Field of Classification Search
None
See application file for complete search history.

(56) References Cited

U.S. PATENT DOCUMENTS

| 8,656,787 B2 * | 2/2014 | Ishihara ................ G01L 9/0042 361/283.4 |
| 10,006,829 B2 * | 6/2018 | Tochigi ................ G01L 9/0072 |
| 2016/0282213 A1 * | 9/2016 | Tochigi ................ G01L 27/007 |

FOREIGN PATENT DOCUMENTS

| JP | 2009-243887 A | 10/2009 |
| JP | 2010-117154 A | 5/2010 |
| JP | 2019-007906 A | 1/2019 |

* cited by examiner

*Primary Examiner* — Lisa M Caputo
*Assistant Examiner* — Nigel H Plumb
(74) *Attorney, Agent, or Firm* — Oblon, McClelland, Maier & Neustadt, L.L.P.

(57) ABSTRACT

An improved diaphragm vacuum gauge including a sensor chip that includes a first electrode provided on a base and a second electrode provided on a diaphragm so as to face the first electrode, the diaphragm and the base being disposed with a gap therebetween, and in which a distance between the first electrode and the second electrode changes in accordance with displacement of the diaphragm caused by pressure of a measurement target medium. The diaphragm vacuum gauge further includes an operational amplifier that converts a current output from the first electrode to a voltage and amplifies the voltage, and a coaxial cable that connects the first electrode and the operational amplifier with each other. Further, the first electrode is connected to a virtual ground of the operational amplifier by a core wire of the coaxial cable.

11 Claims, 11 Drawing Sheets

DIAPHRAGM VACUUM GAUGE WITH DECREASED PARASITIC CAPACITANCE

CROSS-REFERENCE TO RELATED APPLICATIONS

The present application is based on and claims priority to Japanese Application No. 2021-083125, filed May 17, 2021, the entire contents of which are incorporated herein by reference.

BACKGROUND

1. Field of the Disclosure

The present disclosure relates to a diaphragm vacuum gauge.

2. Description of the Related Art

Capacitance-detection-type diaphragm vacuum gauges detect displacement of the diaphragm from a change in the capacitance to thereby perform pressure measurement. Diaphragm vacuum gauges need to detect a slight change in the capacitance, and therefore, a parasitic capacitance or a stray capacitance may affect measurement values. Specifically, a parasitic capacitance or a stray capacitance on a wiring line from a sensor unit to a circuit unit may affect measurement values. Therefore, usually, the circuit unit needs to be disposed near the sensor unit to make the wiring line shorter to the extent possible.

Diaphragm vacuum gauges are often used for semiconductor manufacturing devices. A process gas for semiconductors may be liquefied or solidified when the temperature is not appropriate, adhere to the sensor unit of the diaphragm vacuum gauge, and affect measurement. Therefore, a heater for heating needs to be provided inside or outside diaphragm vacuum gauges to prevent the adherence of a liquefied or solidified gas (see Japanese Unexamined Patent Application Publication No. 2010-117154, Japanese Unexamined Patent Application Publication No. 2009-243887, and Japanese Unexamined Patent Application Publication No. 2019-7906). In such diaphragm vacuum gauges, when a low-thermal-resistance circuit is disposed near the sensor unit, the following issues may arise.

(I) A heat insulating structure is necessary in order to prevent heat conduction from the sensor unit to the circuit unit.

(II) Heat dissipation from the circuit unit is necessary.

(III) If the temperature of the circuit unit rises in spite of heat insulation and heat dissipation, the temperature around the circuit unit needs to be decreased.

As described above, when the circuit unit is disposed near the sensor unit, the issue of the heat resistance of the circuit unit may arise, and therefore, there is a demand for disposing the circuit unit apart from the sensor unit. Further, piping is complicated around a vacuum chamber in which the sensor unit is disposed, and therefore, there is a demand for disposing the circuit unit that requires a space, apart from the sensor unit.

However, when the sensor unit and the circuit unit are disposed apart from each other, measurement values may be affected by a parasitic capacitance or a stray capacitance as described above, and an issue of an error in pressure measurement results may arise.

SUMMARY

The present disclosure has been made to address the above-described issues and provides a diaphragm vacuum gauge that, even when a sensor chip and a circuit unit are disposed apart from each other and are connected to each other by a cable, can measure the capacitance between electrodes of the sensor chip without being affected by a parasitic capacitance or a stray capacitance on the cable.

A diaphragm vacuum gauge according to the present disclosure includes: a sensor chip including a first electrode provided on a base and a second electrode provided on a diaphragm so as to face the first electrode, the diaphragm and the base being disposed with a gap therebetween, and configured such that a distance between the first electrode and the second electrode changes in accordance with displacement of the diaphragm caused by pressure of a measurement target medium; a first operational amplifier configured to convert a current output from the first electrode to a voltage and amplify the voltage; and a coaxial cable configured to connect the first electrode and the first operational amplifier with each other, in which the first electrode is connected to a virtual ground of the first operational amplifier by a core wire of the coaxial cable.

According to one example configuration of the present disclosure, in the diaphragm vacuum gauge, a shield wire of the coaxial cable is connected to a ground of a circuit unit that includes the first operational amplifier.

According to one example configuration of the present disclosure, the diaphragm vacuum gauge further includes: a first coaxial connector provided in a circuit unit including the first operational amplifier, and having a center contact that is connected to the virtual ground of the first operational amplifier; and a second coaxial connector attached to a second end of the coaxial cable having a first end that is connected to the first electrode, and having a center contact that is connected to a second end of the core wire of the coaxial cable, in which the first coaxial connector and the second coaxial connector are coupled to each other to thereby connect the first electrode and the virtual ground of the first operational amplifier with each other.

According to one example configuration of the present disclosure, the diaphragm vacuum gauge further includes: a second operational amplifier configured to apply a sensor driving signal to the second electrode; and a cable configured to connect an output terminal of the second operational amplifier and the second electrode with each other.

According to one example configuration of the present disclosure, the diaphragm vacuum gauge further includes: a capacitance calculation unit configured to calculate a value of a capacitance between the first electrode and the second electrode on the basis of an output signal of the first operational amplifier; and a pressure measurement unit configured to convert the capacitance to a pressure measurement value.

A diaphragm vacuum gauge according to the present disclosure includes: a sensor chip including a first electrode provided on a base, a second electrode provided on a diaphragm so as to face the first electrode, the diaphragm and the base being disposed with a gap therebetween, a third electrode provided outside the first electrode on the base, and a fourth electrode provided outside the second electrode on the diaphragm so as to face the third electrode, and configured such that a distance between the first electrode and the second electrode changes in accordance with displacement of the diaphragm caused by pressure of a measurement target medium; a first operational amplifier configured to convert a current output from the first electrode to a voltage and amplify the voltage; a second operational amplifier configured to convert a current output from the third electrode to a voltage and amplify the voltage; a first coaxial cable configured to connect the first electrode and the first operational amplifier with each other; and a second coaxial cable configured to connect the third electrode and the second operational amplifier with each other, in which the first electrode is connected to a virtual ground of the first operational amplifier by a core wire of the first coaxial cable, and the third electrode is connected to a virtual ground of the second operational amplifier by a core wire of the second coaxial cable.

According to one example configuration of the present disclosure, in the diaphragm vacuum gauge, a shield wire of the first coaxial cable and a shield wire of the second coaxial cable are connected to a ground of a circuit unit that includes the first operational amplifier and the second operational amplifier.

According to one example configuration of the present disclosure, the diaphragm vacuum gauge further includes: a first coaxial connector provided in a circuit unit including the first operational amplifier and the second operational amplifier, and having a center contact that is connected to the virtual ground of the first operational amplifier; a second coaxial connector attached to a second end of the first coaxial cable having a first end that is connected to the first electrode, and having a center contact that is connected to a second end of the core wire of the first coaxial cable; a third coaxial connector provided in the circuit unit including the first operational amplifier and the second operational amplifier, and having a center contact that is connected to the virtual ground of the second operational amplifier; and a fourth coaxial connector attached to a second end of the second coaxial cable having a first end that is connected to the third electrode, and having a center contact that is connected to a second end of the core wire of the second coaxial cable, in which the first coaxial connector and the second coaxial connector are coupled to each other to thereby connect the first electrode and the virtual ground of the first operational amplifier with each other, and the third coaxial connector and the fourth coaxial connector are coupled to each other to thereby connect the third electrode and the virtual ground of the second operational amplifier with each other.

According to one example configuration of the present disclosure, the diaphragm vacuum gauge further includes: a third operational amplifier configured to apply a sensor driving signal to the second electrode and to the fourth electrode; and a cable configured to connect an output terminal of the third operational amplifier with the second electrode and with the fourth electrode.

According to one example configuration of the present disclosure, the diaphragm vacuum gauge further includes: a subtracter configured to subtract an output signal of the second operational amplifier from an output signal of the first operational amplifier; a capacitance calculation unit configured to calculate a value of a first capacitance between the first electrode and the second electrode on the basis of the output signal of the first operational amplifier; a capacitance difference calculation unit configured to calculate a value obtained by subtracting a second capacitance between the third electrode and the fourth electrode from the first capacitance on the basis of an output signal of the subtracter; a capacitance correction unit configured to correct the first capacitance with the second capacitance on the basis of a result of calculation by the capacitance calculation unit and a result of calculation by the capacitance difference calculation unit; and a pressure measurement unit configured to convert the corrected first capacitance to a pressure measurement value.

According to one example configuration of the present disclosure, in the diaphragm vacuum gauge, the second electrode and the fourth electrode are electrically connected to each other to form a single electrode.

According to the present disclosure, even when the sensor chip and the circuit unit are disposed apart from each other and are connected to each other by a cable, a slight capacitance between the electrodes of the sensor chip can be measured without being affected by a parasitic capacitance or a stray capacitance on the cable, and a pressure measurement error due to the parasitic capacitance or the stray capacitance can be reduced. In the related art, a structure in which the cable does not shift needs to be employed to prevent a parasitic capacitance on the cable from changing. In contrast, in the present disclosure, even when the cable shifts, the capacitance between the electrodes of the sensor chip is affected to a small degree. Therefore, a flexible cable can be used, a housing of a pressure receiving unit accommodating the sensor chip and a separate housing accommodating the circuit unit can be disposed at separate locations, and the housings can be oriented as desired. This can facilitate on-site instrumentation of the diaphragm vacuum gauge.

DETAILED DESCRIPTION

First Embodiment

Figure 1:
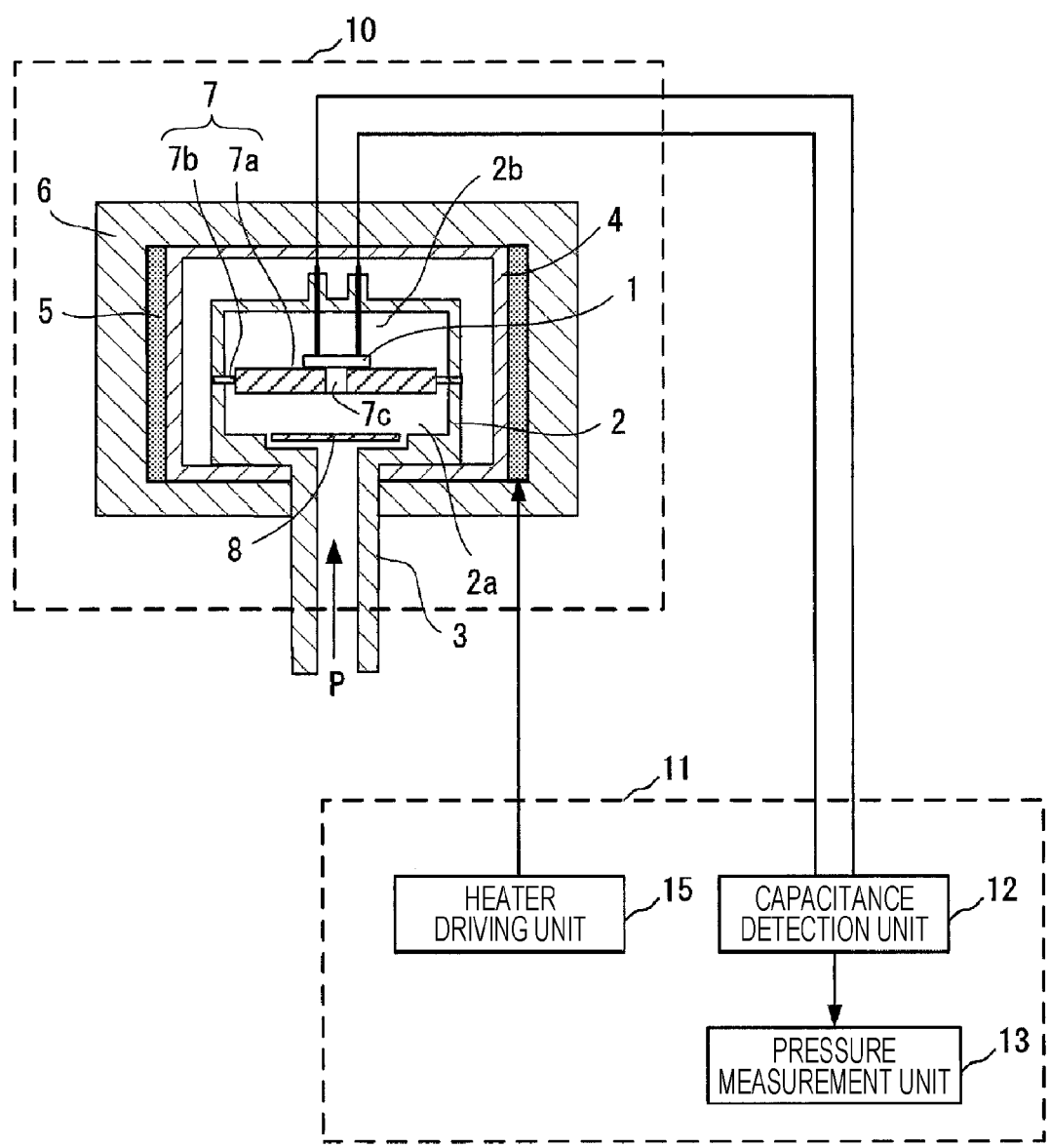
FIG. 1 is a block diagram illustrating a configuration of a diaphragm vacuum gauge according to a first embodiment of the present disclosure.
Figure 2:
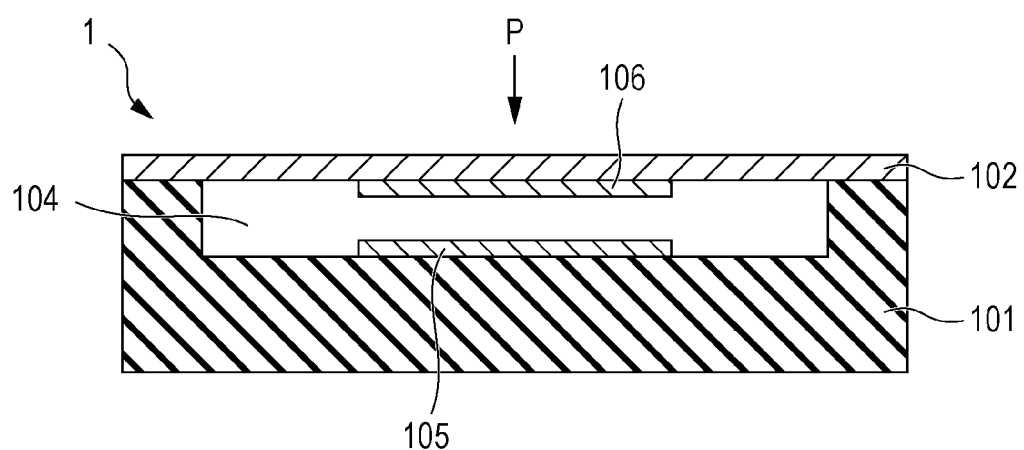
FIG. 2 is a cross-sectional view of a sensor chip of the diaphragm vacuum gauge according to the first embodiment of the present disclosure.

Hereinafter, embodiments of the present disclosure will be described with reference to the drawings. FIG. 1 is a block diagram illustrating a configuration of a diaphragm vacuum gauge according to a first embodiment of the present disclosure, and FIG. 2 is a cross-sectional view of a sensor chip included in the diaphragm vacuum gauge.

The diaphragm vacuum gauge includes a pressure receiving unit 10 having a capacitance that changes in accordance with displacement of a diaphragm caused by the pressure of a measurement target medium (for example, a process gas), and a circuit unit 11 that converts the change in the capacitance of the pressure receiving unit 10 to a pressure measurement value.

In a center part of a base 101 of a sensor chip 1 included in the pressure receiving unit 10, an indentation is provided. On a surface of the base 101 on which the indentation is provided, a diaphragm 102 configured to deform in accordance with the pressure P of the measurement target medium (for example, a process gas) is bonded. The indentation of the base 101 forms a reference vacuum chamber 104 together with the diaphragm 102.

In the sensor chip 1, on a surface of the base 101 facing the reference vacuum chamber 104, a fixed electrode 105 is provided, and on a surface of the diaphragm 102 facing the reference vacuum chamber 104, a movable electrode 106 is provided so as to face the fixed electrode 105. Accordingly, the fixed electrode 105 and the movable electrode 106 are disposed so as to face each other with a gap therebetween. When the diaphragm 102 receives the pressure P of the measurement target medium and warps, the distance between the movable electrode 106 and the fixed electrode 105 changes, and the capacitance between the movable electrode 106 and the fixed electrode 105 changes. From this change in the capacitance, the pressure P of the measurement target medium received by the diaphragm 102 can be detected. The diaphragm 102 and the base 101 are formed of an insulator, such as sapphire.

The diaphragm vacuum gauge illustrated in FIG. 1 includes the sensor chip 1 thus configured, a housing 2 that accommodates the sensor chip 1, a pressure transmission pipe 3 through which the pressure P of the measurement target medium is transmitted to the diaphragm 102 of the sensor chip 1, a sensor case 4 that covers the housing 2, and a heater 5 that is provided around the outer circumference surface of the sensor case 4. The sensor case 4 provided with the heater 5 is covered by a heat insulator 6.

Note that the heater 5 need not be provided inside the housing 2 and may be provided outside the housing 2. Further, the heat insulator 6 need not be provided.

Inside the housing 2, a partition 7 is provided. The partition 7 includes a base plate 7a and a support plate 7b and partitions the interior space of the housing 2 into a first space 2a and a second space 2b. The outer circumference of the support plate 7b is fixed to the housing 2, and the support plate 7b supports the base plate 7a so as to be suspended in the interior space of the housing 2. The sensor chip 1 is fixed to a side of the base plate 7a facing the second space 2b. In the base plate 7a, a pressure transmission inlet 7c through which pressure inside the first space 2a is transmitted to the diaphragm 102 of the sensor chip 1 is provided. The second space 2b communicates with the reference vacuum chamber 104 of the sensor chip 1 and is kept under vacuum.

The pressure transmission pipe 3 is connected to the housing 2 on a side facing the first space 2a. Between the pressure transmission pipe 3 and the housing 2, a baffle 8 is provided. The measurement target medium introduced through the pressure transmission pipe 3 comes into contact with a plate surface of the baffle 8 and flows into the first space 2a of the housing 2 through a space around the baffle 8.

The circuit unit 11 of the diaphragm vacuum gauge includes a capacitance detection unit 12, a pressure measurement unit 13, and a heater driving unit 15.

Figure 3:
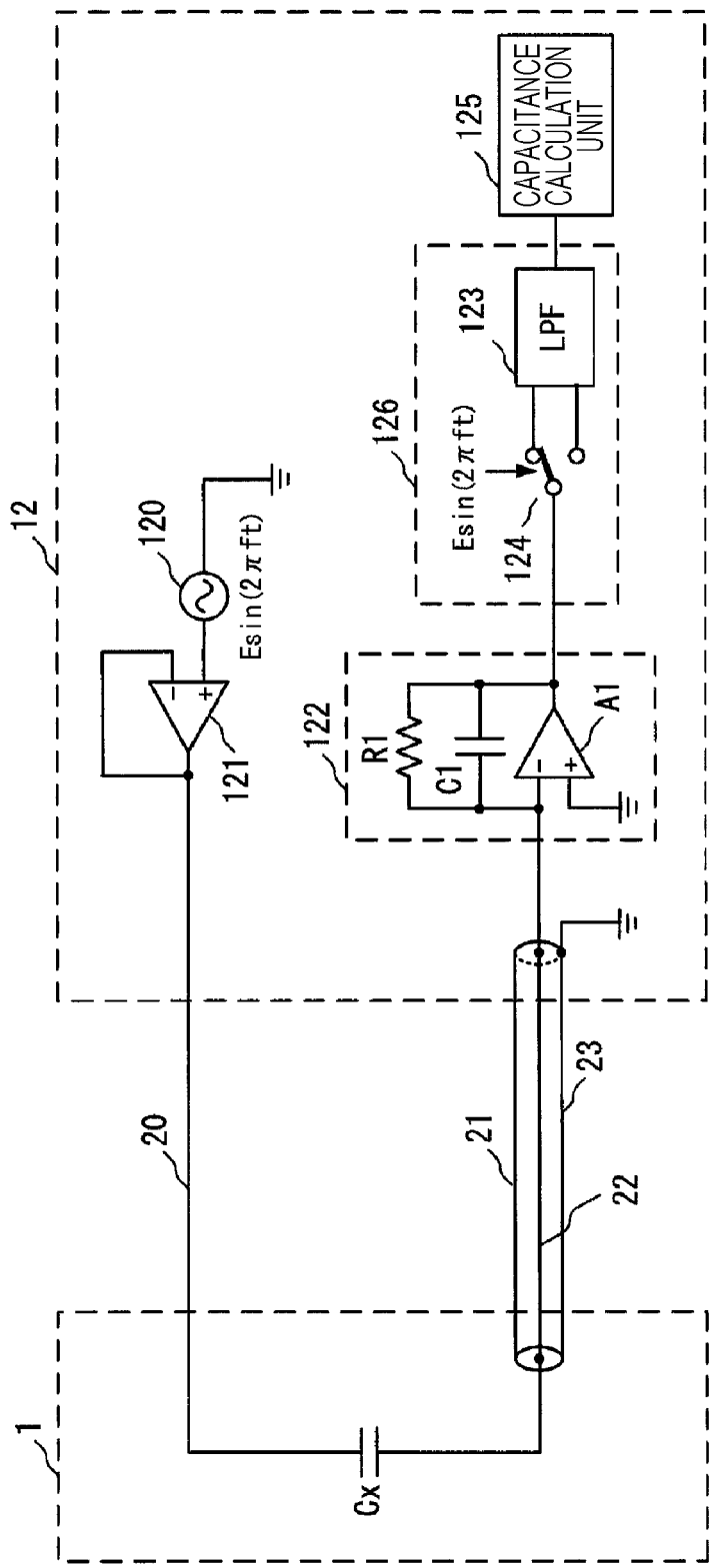
FIG. 3 is a diagram illustrating a connecting structure between the sensor chip and a circuit unit of the diaphragm vacuum gauge and a configuration of a capacitance detection unit according to the first embodiment of the present disclosure.
Figure 4:
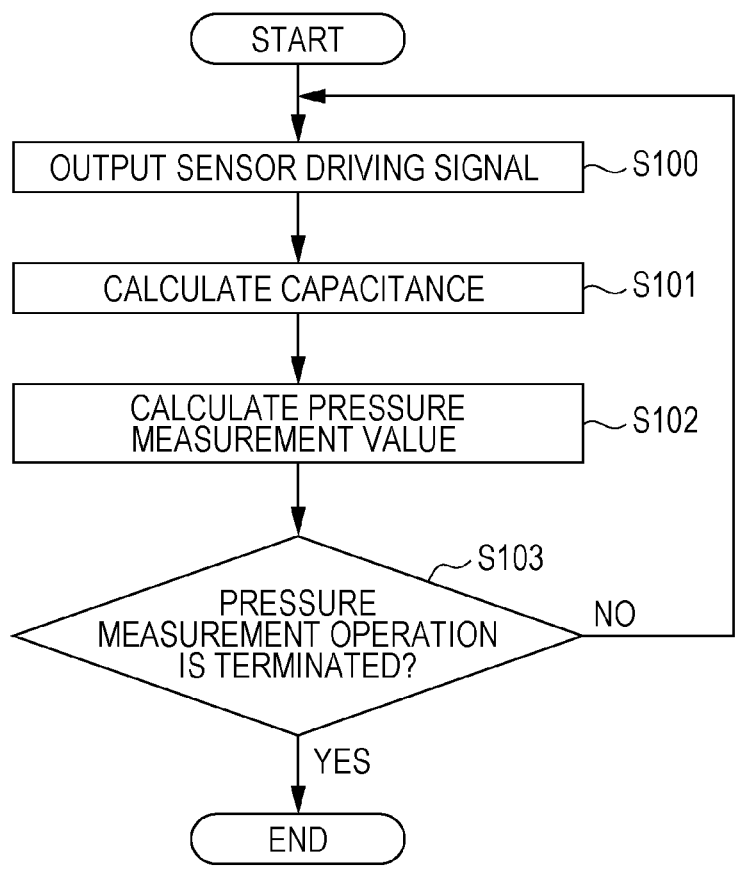
FIG. 4 is a flowchart for explaining a pressure measurement operation by the diaphragm vacuum gauge according to the first embodiment of the present disclosure.

FIG. 3 is a diagram illustrating a connecting structure between the sensor chip 1 and the circuit unit 11 and a configuration of the capacitance detection unit 12, and FIG. 4 is a flowchart for explaining a pressure measurement operation by the diaphragm vacuum gauge of the first embodiment.

The capacitance detection unit 12 includes a signal generator 120 that outputs a sensor driving signal, an operational amplifier 121 that transmits the sensor driving signal from the signal generator 120 to the sensor chip 1 via a cable 20, an amplifier 122 that includes a capacitor C1, a resistor R1, and an operational amplifier A1, a differential-input low-pass filter 123, a switch 124 that is provided between the amplifier 122 and the low-pass filter 123, and a capacitance calculation unit 125 that calculates the value of the capacitance between the movable electrode 106 and the fixed electrode 105. In FIG. 3, the capacitance between the movable electrode 106 and the fixed electrode 105 of the sensor chip 1 is illustrated as Cx.

The signal generator 120 of the capacitance detection unit 12 outputs a sinusoidal sensor driving signal $E \sin(2\pi f t)$ for pressure measurement to the operational amplifier 121 and to the switch 124. E denotes the amplitude, f denotes the frequency, and t denotes the time.

The operational amplifier 121 has an inverting input terminal and an output terminal that are connected to each other and a noninverting input terminal that is connected to the output terminal of the signal generator 120, and forms a voltage follower (buffer). The output terminal of the operational amplifier 121 and a second electrode (for example, the movable electrode 106) of the sensor chip 1 are connected to each other by the cable 20. The operational amplifier 121 applies the sensor driving signal $E \sin(2\pi f t)$ to the second electrode of the sensor chip 1 via the cable 20 (step S100 in FIG. 4).

A first electrode (for example, the fixed electrode 105) of the sensor chip 1 and the input terminal of the amplifier 122 (the inverting input terminal of the operational amplifier A1) of the capacitance detection unit 12 are connected to each other by a coaxial cable 21.

The amplifier 122 includes the operational amplifier A1, and the capacitor C1 and the resistor R1 connected between the inverting input terminal and the output terminal of the operational amplifier A1. The amplifier 122 converts a current output from the first electrode of the sensor chip 1 to a voltage, amplifies the voltage, and outputs a signal having an amplitude proportional to the capacitance Cx.

The switch 124 and the low-pass filter 123 of the capacitance detection unit 12 constitute a synchronous detection unit 126. The low-pass filter 123 has a cutoff frequency that is set so as to allow the sensor driving signal $E \sin(2\pi f t)$ to pass therethrough. The synchronous detection unit 126 demodulates a signal that is in synchronization with the sensor driving signal $E \sin(2\pi ft)$ from the output of the amplifier 122.

Specifically, when the sensor driving signal $E \sin(2\pi ft)$ is positive, the switch 124 connects the output terminal of the amplifier 122 and the noninverting input terminal of the low-pass filter 123 with each other. When the sensor driving signal $E \sin(2\pi ft)$ is negative, the switch 124 connects the output terminal of the amplifier 122 and the inverting input terminal of the low-pass filter 123 with each other. Accordingly, a signal that is in synchronization with the sensor driving signal $E \sin(2\pi ft)$ can be demodulated from the output of the amplifier 122.

The capacitance calculation unit 125 calculates the value of the capacitance Cx from the amplitude of the output signal of the synchronous detection unit 126 (step S101 in FIG. 4).

The pressure measurement unit 13 converts a change in the capacitance Cx calculated by the capacitance detection unit 12 to a pressure measurement value and outputs the pressure measurement value (step S102 in FIG. 4).

The heater driving unit 15 drives the heater 5 to heat the pressure receiving unit 10, thereby preventing an ingredient in the measurement target gas from being liquefied or solidified and adhering to the sensor chip 1.

The diaphragm vacuum gauge performs the process in step S100 to step S102 for each measurement cycle until the pressure measurement operation is terminated, for example, in accordance with a user instruction (YES in step S103 in FIG. 4).

As described above, in the first embodiment, the sensor chip 1 and the circuit unit 11 are disposed apart from each other and are connected to each other by the cable 20 and by the coaxial cable 21. As is commonly known, the coaxial cable 21 includes a core wire 22, an insulator (not illustrated) that surrounds the core wire 22, a shield wire 23 that is an external conductor and surrounds the insulator, and a protective sheath (not illustrated) that surrounds the shield wire 23.

The first electrode of the sensor chip 1 is connected to the inverting input terminal, that is, the virtual ground, of the operational amplifier A1 that constitutes the capacitance detection unit 12 of the circuit unit 11 by the core wire 22 of the coaxial cable 21. The shield wire 23 of the coaxial cable 21 is connected to the ground of the circuit unit 11 that is at the same potential as the virtual ground of the operational amplifier A1.

With the connecting structure between the sensor chip 1 and the circuit unit 11 as described above, in the first embodiment, measurement is less likely to be affected by a parasitic capacitance or a stray capacitance on the extension part, that is, the cable 20 and the coaxial cable 21.

Specifically, the cable 20 for inputting the sensor driving signal to the second electrode on the input side of the sensor chip 1 is connected to the output terminal of the operational amplifier 121. On the input side of the sensor chip 1, measurement is less likely to be affected by a parasitic capacitance or a stray capacitance on the cable 20 because the output impedance of the operational amplifier 121 is low.

In contrast, on the output side, measurement is more likely to be affected by a parasitic capacitance or a stray capacitance on the cable 21 because the input impedance of the operational amplifier A1 is high. To reduce the effect of a parasitic capacitance or a stray capacitance on the cable 21, in the first embodiment, a coaxial cable is used as the cable 21, the first electrode of the sensor chip 1 and the virtual ground of the operational amplifier A1 are connected to each other by the core wire 22 of the coaxial cable 21, and the shield wire 23 of the coaxial cable 21 is connected to the ground of the circuit unit 11. When the core wire 22 and the shield wire 23 are at the same potential, measurement is less likely to be affected by a parasitic capacitance or a stray capacitance on the coaxial cable 21.

Second Embodiment

Figure 5:
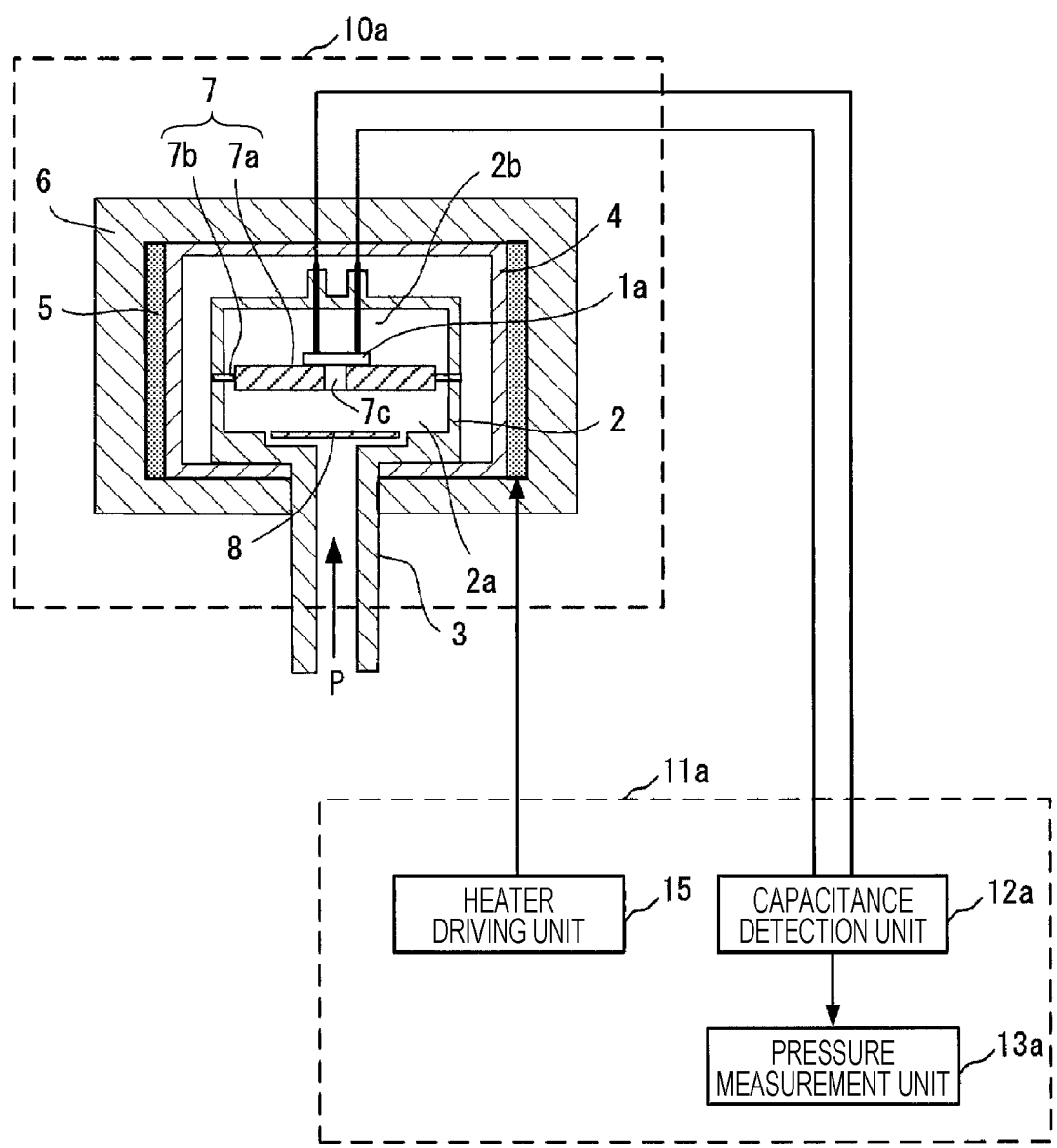
FIG. 5 is a block diagram illustrating a configuration of a diaphragm vacuum gauge according to a second embodiment of the present disclosure.

Now, a second embodiment of the present disclosure will be described. FIG. 5 is a block diagram illustrating a configuration of a diaphragm vacuum gauge according to the second embodiment of the present disclosure, in which components the same as those in FIG. 1 are assigned the same reference numerals. The diaphragm vacuum gauge of the second embodiment includes a pressure receiving unit 10a and a circuit unit 11a.

Figure 6:
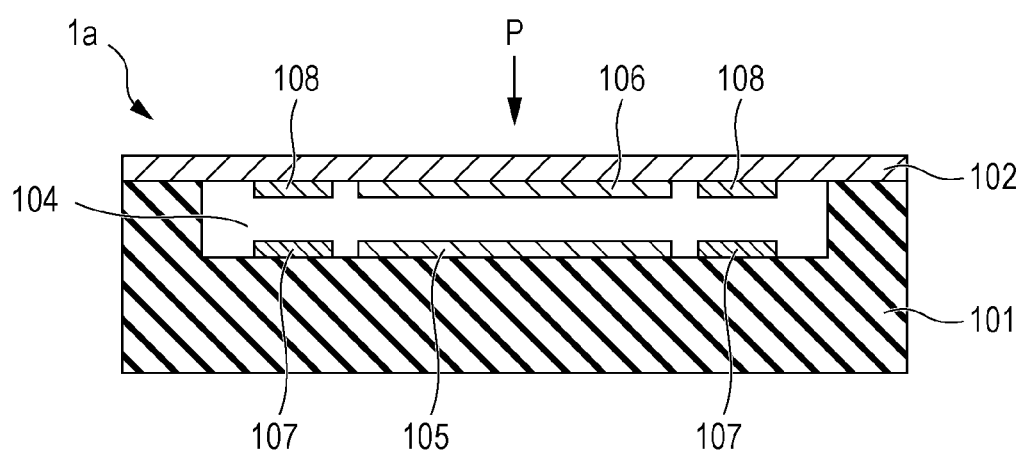
FIG. 6 is a cross-sectional view of a sensor chip of the diaphragm vacuum gauge according to the second embodiment of the present disclosure.

FIG. 6 is a cross-sectional view of a sensor chip 1a of the second embodiment. In the sensor chip 1a, on the surface of the base 101 facing the reference vacuum chamber 104, a fixed electrode 107 is provided outside the fixed electrode 105. On the surface of the diaphragm 102 facing the reference vacuum chamber 104, a movable electrode 108 is provided outside the movable electrode 106 so as to face the fixed electrode 107. The configuration of the sensor chip 1a other than that described above is the same as that of the sensor chip 1.

The fixed electrode 107 and the movable electrode 108 are provided near the peripheral part of the diaphragm 102. Even when the diaphragm 102 receives the pressure P of the measurement target medium and warps, the peripheral part of the diaphragm 102 negligibly deforms, and therefore, the capacitance between the movable electrode 108 and the fixed electrode 107 is less likely to change. This capacitance is provided to remove a measurement error based on, for example, a change in the temperature inside or outside the sensor and a change in the humidity inside the reference vacuum chamber 104.

The circuit unit 11a includes a capacitance detection unit 12a, a pressure measurement unit 13a, and the heater driving unit 15.

Figure 7:
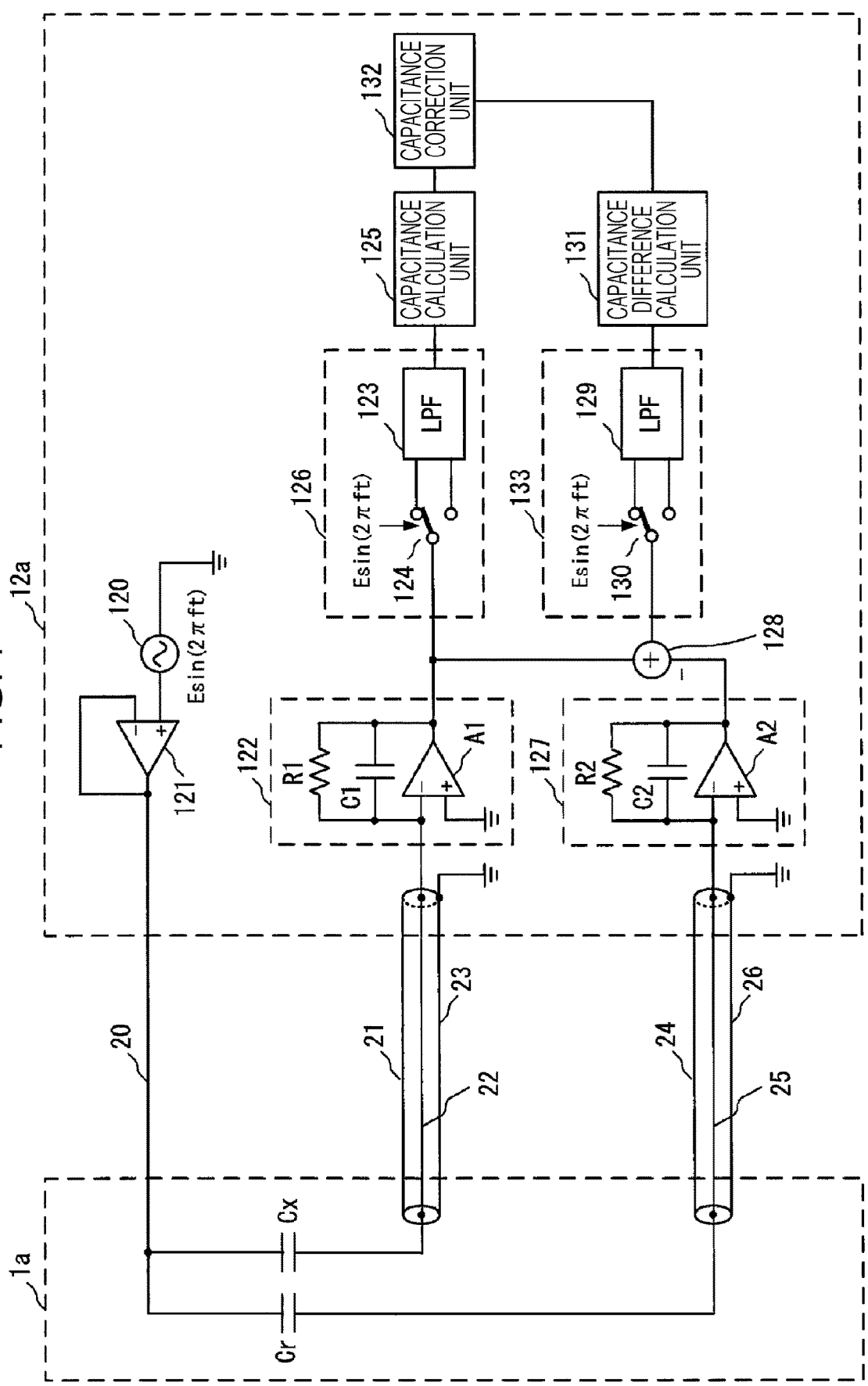
FIG. 7 is a diagram illustrating a connecting structure between the sensor chip and a circuit unit of the diaphragm vacuum gauge and a configuration of a capacitance detection unit according to the second embodiment of the present disclosure.
Figure 8:
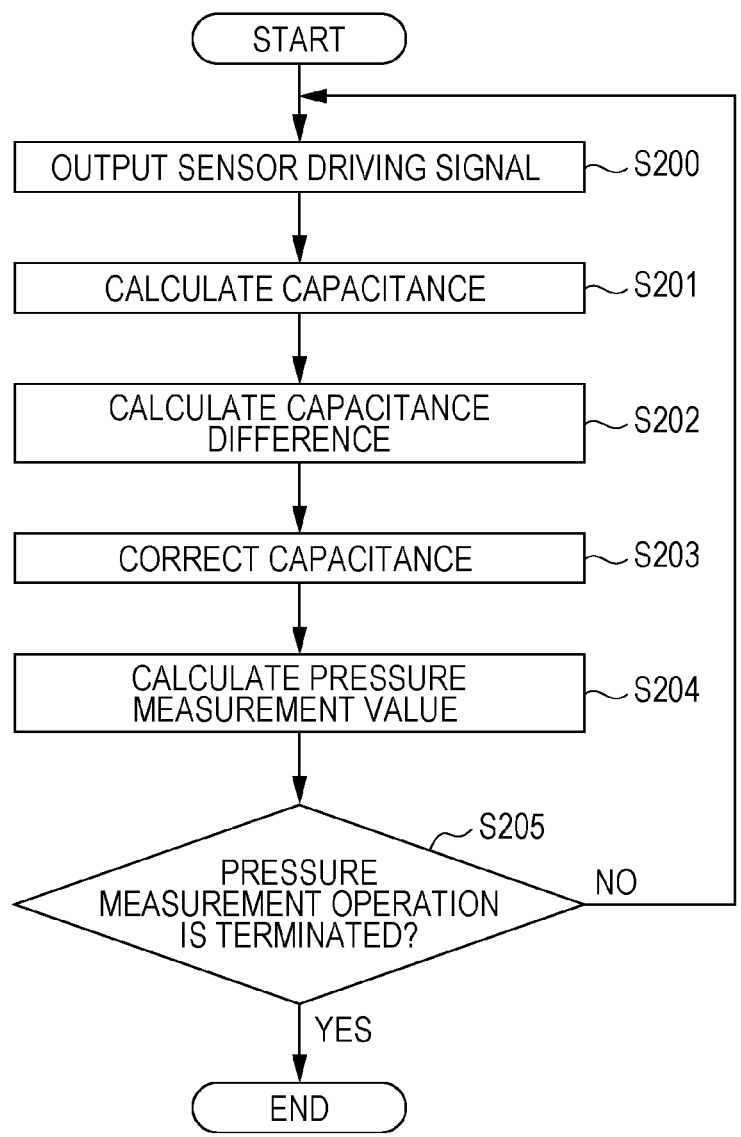
FIG. 8 is a flowchart for explaining a pressure measurement operation by the diaphragm vacuum gauge according to the second embodiment of the present disclosure.

FIG. 7 is a diagram illustrating a connecting structure between the sensor chip 1a and the circuit unit 11a and a configuration of the capacitance detection unit 12a, and FIG. 8 is a flowchart for explaining a pressure measurement operation by the diaphragm vacuum gauge of the second embodiment.

The capacitance detection unit 12a includes the signal generator 120, the operational amplifier 121, the amplifier 122, the low-pass filter 123, the switch 124, the capacitance calculation unit 125, an amplifier 127 that includes a capacitor C2, a resistor R2, and an operational amplifier A2, a subtracter 128, a differential-input low-pass filter 129, a switch 130 that is provided between the subtracter 128 and the low-pass filter 129, a capacitance difference calculation unit 131, and a capacitance correction unit 132. In FIG. 7, the capacitance between the movable electrode 108 and the fixed electrode 107 of the sensor chip 1a is illustrated as Cr.

The signal generator 120 of the capacitance detection unit 12a outputs the sensor driving signal $E \sin(2\pi ft)$ to the operational amplifier 121 and to the switches 124 and 130. The operational amplifier 121 applies the sensor driving signal $E \sin(2\pi ft)$ to the second electrode (for example, the movable electrode 106) and to a fourth electrode (for example, the movable electrode 108) of the sensor chip 1a via the cable 20 (step S200 in FIG. 8).

The amplifier 122 converts a current output from the first electrode (for example, the fixed electrode 105) of the sensor chip 1a to a voltage, amplifies the voltage, and outputs a signal having an amplitude proportional to the capacitance Cx.

The amplifier 127 includes the operational amplifier A2, and the capacitor C2 and the resistor R2 connected between the inverting input terminal and the output terminal of the operational amplifier A2. The amplifier 127 converts a current output from a third electrode (for example, the fixed electrode 107) of the sensor chip 1a to a voltage, amplifies the voltage, and outputs a signal having an amplitude proportional to the capacitance Cr.

The subtracter 128 subtracts the output signal of the amplifier 127 from the output signal of the amplifier 122.

As in the first embodiment, the synchronous detection unit 126 demodulates a signal that is in synchronization with the sensor driving signal $E \sin(2\pi ft)$ from the output of the amplifier 122.

The switch 130 and the low-pass filter 129 constitute a synchronous detection unit 133. The low-pass filter 129 has a cutoff frequency that is set so as to allow the sensor driving signal $E \sin(2\pi ft)$ to pass therethrough. The synchronous detection unit 133 demodulates a signal that is in synchronization with the sensor driving signal $E \sin(2\pi ft)$ from the output of the subtracter 128.

Specifically, when the sensor driving signal $E \sin(2\pi ft)$ is positive, the switch 130 connects the output terminal of the subtracter 128 and the noninverting input terminal of the low-pass filter 129 with each other. When the sensor driving signal $E \sin(2\pi ft)$ is negative, the switch 130 connects the output terminal of the subtracter 128 and the inverting input terminal of the low-pass filter 129 with each other. Accordingly, a signal that is in synchronization with the sensor driving signal $E \sin(2\pi ft)$ can be demodulated from the output of the subtracter 128.

The capacitance calculation unit 125 calculates the value of the capacitance Cx from the amplitude of the output signal of the synchronous detection unit 126 (step S201 in FIG. 8).

The capacitance difference calculation unit 131 calculates the value of the capacitance difference (Cx−Cr) from the amplitude of the output signal of the synchronous detection unit 133 (step S202 in FIG. 8).

The capacitance correction unit 132 calculates a value (Cx−Cr)/Cx obtained by correcting the capacitance Cx with the reference capacitance Cr on the basis of the result of calculation by the capacitance calculation unit 125 and the result of calculation by the capacitance difference calculation unit 131 (step S203 in FIG. 8).

The pressure measurement unit 13a converts the capacitance (Cx−Cr)/Cx calculated by the capacitance correction unit 132 to a pressure measurement value (step S204 in FIG. 8).

The heater driving unit 15 drives the heater 5 to heat the pressure receiving unit 10a, thereby preventing an ingredient in the measurement target gas from being liquefied or solidified and adhering to the sensor chip 1a.

The diaphragm vacuum gauge performs the process in step S200 to step S204 for each measurement cycle until the pressure measurement operation is terminated, for example, in accordance with a user instruction (YES in step S205 in FIG. 8).

As in the first embodiment, in the second embodiment, the sensor chip 1a and the circuit unit 11a are disposed apart from each other and are connected to each other by the cable 20, the coaxial cable 21, and a coaxial cable 24.

The first electrode of the sensor chip 1a is connected to the virtual ground of the operational amplifier A1 that constitutes the capacitance detection unit 12a of the circuit unit 11a by the core wire 22 of the coaxial cable 21. The shield wire 23 of the coaxial cable 21 is connected to the ground of the circuit unit 11a that is at the same potential as the virtual ground of the operational amplifier A1. The third electrode of the sensor chip 1a is connected to the virtual ground of the operational amplifier A2 that constitutes the capacitance detection unit 12a of the circuit unit 11a by a core wire 25 of the coaxial cable 24. A shield wire 26 of the coaxial cable 24 is connected to the ground of the circuit unit 11a that is at the same potential as the virtual ground of the operational amplifier A2.

Accordingly, in the second embodiment, measurement is less likely to be affected by a parasitic capacitance or a stray capacitance on the cable 20 and on the coaxial cables 21 and 24 as in the first embodiment.

Although a single-wire cable is used as the cable 20 in the first and second embodiments, a coaxial cable may be used.

Figure 9:
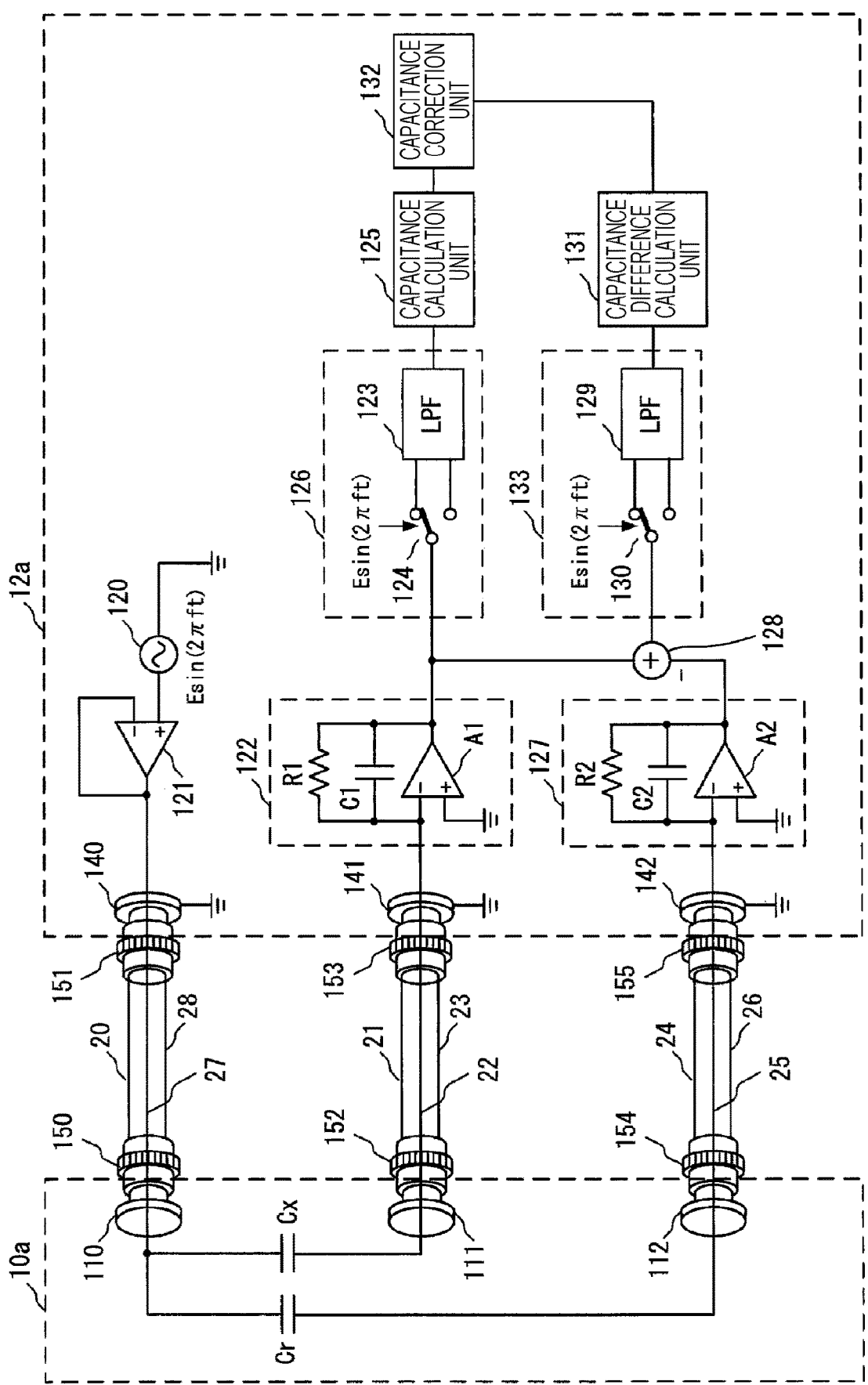
FIG. 9 is a diagram illustrating another example connecting structure between the sensor chip and the circuit unit of the diaphragm vacuum gauge according to the second embodiment of the present disclosure.

In the first and second embodiments, a coaxial connector may be used in at least one of the connection of a coaxial cable with the pressure receiving unit 10 or 10a or the connection of a coaxial cable with the circuit unit 11 or 11a. FIG. 9 illustrates a configuration where coaxial connectors are used. In the example illustrated in FIG. 9, the center contact of a receptacle 110 (the female terminal of a coaxial connector) in the pressure receiving unit 10a is connected to the second electrode and to the fourth electrode of the sensor chip 1a, the center contact of a receptacle 111 is connected to the first electrode of the sensor chip 1a, and the center contact of a receptacle 112 is connected to the third electrode of the sensor chip 1a.

The center contact of a receptacle 140 in the circuit unit 11a is connected to the output terminal of the operational amplifier 121, the center contact of a receptacle 141 is connected to the inverting input terminal of the operational amplifier A1, and the center contact of a receptacle 142 is connected to the inverting input terminal of the operational amplifier A2. The bodies of the receptacles 140 to 142 are connected to the ground of the circuit unit 11a.

The coaxial cable 20 includes a core wire 27, an insulator (not illustrated) that surrounds the core wire 27, a shield wire 28 that surrounds the insulator, and a protective sheath (not illustrated) that surrounds the shield wire 28. The first end of the core wire 27 is connected to the center contact of a plug 150 (the male terminal of the coaxial connector), and the first end of the shield wire 28 is connected to the body of the plug 150. The second end of the core wire 27 is connected to the center contact of a plug 151, and the second end of the shield wire 28 is connected to the body of the plug 151.

The first end of the core wire 22 of the coaxial cable 21 is connected to the center contact of a plug 152, and the first end of the shield wire 23 is connected to the body of the plug 152. The second end of the core wire 22 is connected to the center contact of a plug 153, and the second end of the shield wire 23 is connected to the body of the plug 153. The first end of the core wire 25 of the coaxial cable 24 is connected to the center contact of a plug 154, and the first end of the shield wire 26 is connected to the body of the plug 154. The second end of the core wire 25 is connected to the center contact of a plug 155, and the second end of the shield wire 26 is connected to the body of the plug 155.

The plugs 150 and 151 are respectively coupled to the receptacles 110 and 140, the plugs 152 and 153 are respectively coupled to the receptacles 111 and 141, and the plugs 154 and 155 are respectively coupled to the receptacles 112 and 142 to thereby connect the pressure receiving unit 10a and the circuit unit 11a with each other. A set of one plug and one receptacle coupled to the plug functions as one coaxial connector.

As described above, a single-wire cable may be used as the cable 20. When a single-wire cable is used, a single-wire-cable connector needs to be used instead of a coaxial connector.

Figure 10:
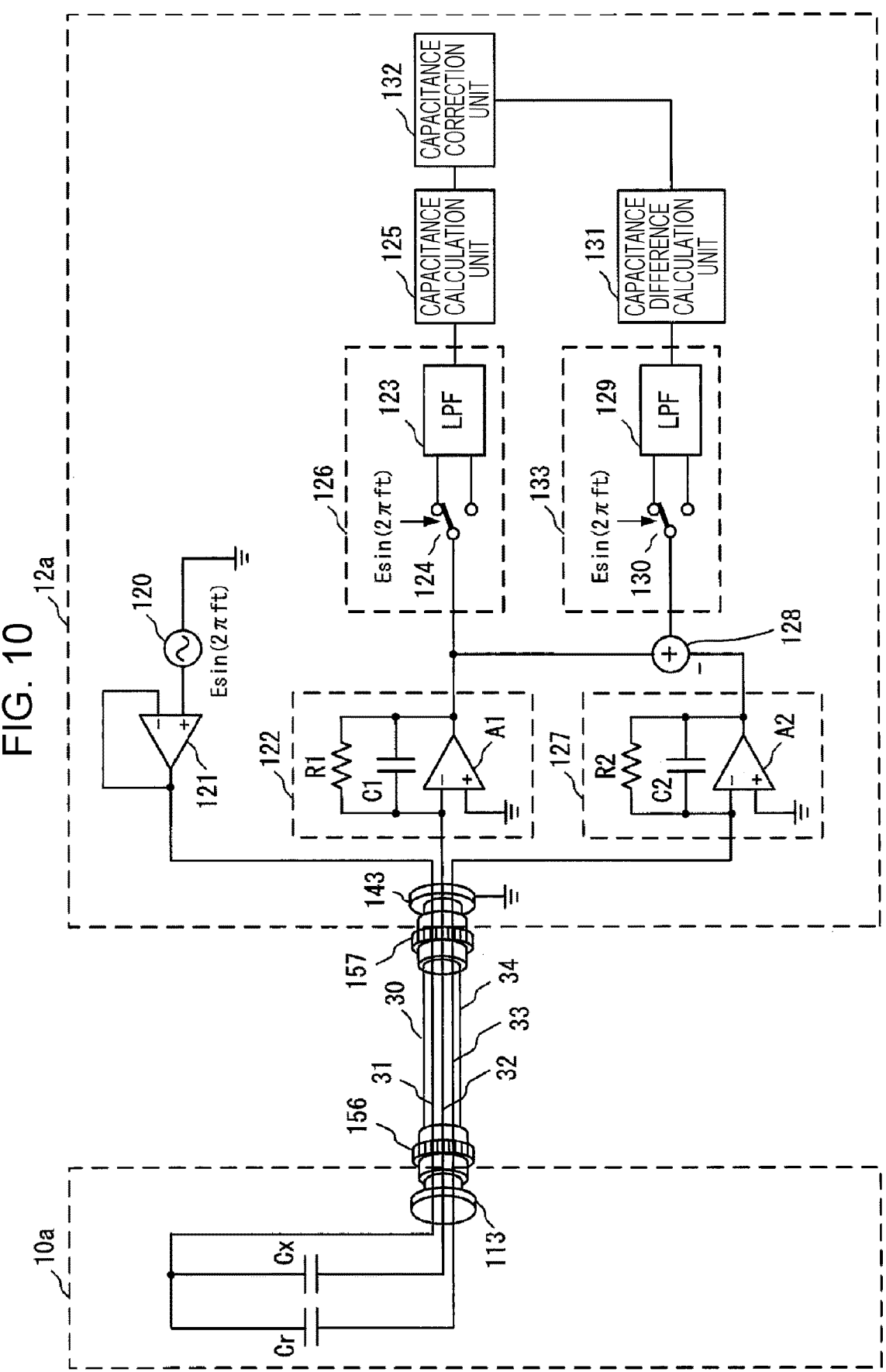
FIG. 10 is a diagram illustrating another example connecting structure between the sensor chip and the circuit unit of the diaphragm vacuum gauge according to the second embodiment of the present disclosure.

In the first and second embodiments, a multi-wire coaxial cable into which cables that connect the pressure receiving unit 10 or 10a and the circuit unit 11 or 11a with each other are integrated may be used. A multi-wire coaxial connector may be used in at least one of the connection of a multi-wire coaxial cable with the pressure receiving unit 10 or 10a or the connection of a multi-wire coaxial cable with the circuit unit 11 or 11a. FIG. 10 illustrates a configuration where multi-wire coaxial connectors are used.

In the example illustrated in FIG. 10, the first center contact of a receptacle 113 in the pressure receiving unit 10a is connected to the second electrode and to the fourth electrode of the sensor chip 1a, the second center contact thereof is connected to the first electrode of the sensor chip 1a, and the third center contact thereof is connected to the third electrode of the sensor chip 1a.

The first center contact of a receptacle 143 in the circuit unit 11a is connected to the output terminal of the operational amplifier 121, the second center contact thereof is connected to the inverting input terminal of the operational amplifier A1, and the third center contact thereof is connected to the inverting input terminal of the operational amplifier A2. The body of the receptacle 143 is connected to the ground of the circuit unit 11a.

The first end of a first core wire 31 of a multi-wire coaxial cable 30 is connected to the first center contact of a plug 156, the first end of a second core wire 32 is connected to the second center contact of the plug 156, and the first end of a third core wire 33 is connected to the third center contact of the plug 156. The first end of a shield wire 34 of the multi-wire coaxial cable 30 is connected to the body of the plug 156. The second end of the first core wire 31 of the multi-wire coaxial cable 30 is connected to the first center contact of a plug 157, the second end of the second core wire 32 is connected to the second center contact of the plug 157, and the second end of the third core wire 33 is connected to the third center contact of the plug 157. The second end of the shield wire 34 is connected to the body of the plug 157.

The plugs 156 and 157 are respectively coupled to the receptacles 113 and 143 to thereby connect the pressure receiving unit 10a and the circuit unit 11a with each other.

Although FIG. 9 and FIG. 10 respectively illustrate examples where coaxial connectors and multi-wire coaxial connectors are used in the second embodiment, coaxial connectors or multi-wire coaxial connectors may be used in the first embodiment as a matter of course.

Figure 11:
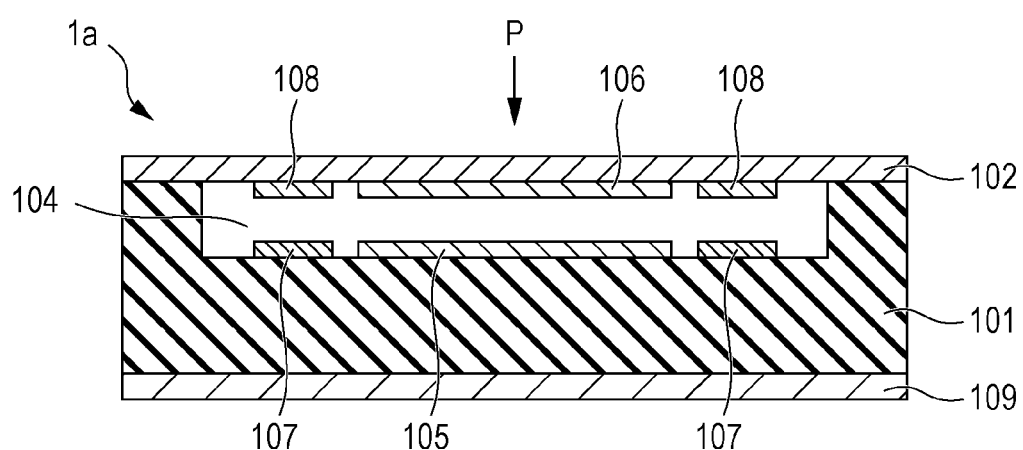
FIG. 11 is a cross-sectional view of another example sensor chip of the diaphragm vacuum gauge according to the second embodiment of the present disclosure.

In the first and second embodiments, a parasitic capacitance present in the sensor chip 1 or 1a may be shielded with the potential at the ground of a shield wire of a coaxial cable. Specifically, as illustrated in FIG. 11, for example, a metal thin plate 109 needs to be bonded to the base 101, made of sapphire, of the sensor chip 1a, and the metal thin plate 109 needs to be connected to the shield wire 28, 23, 26, or 34 of the coaxial cable 20, 21, 24, or 30 (the body of the receptacle 110, 111, 112, or 113). Although FIG. 11 illustrates an example where a shield is applied to the sensor chip 1a in the second embodiment, a shield may be applied to the sensor chip 1 in the first embodiment as a matter of course.

Figure 12:
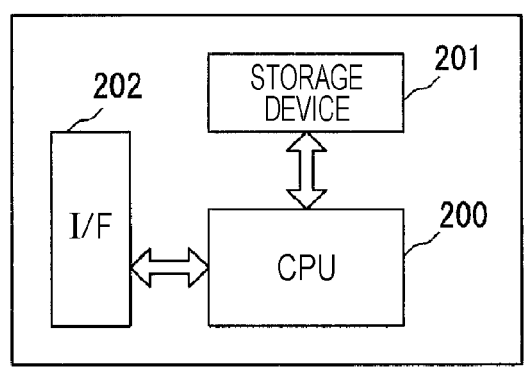
FIG. 12 is a block diagram illustrating an example configuration of a computer that constitutes the circuit unit of the diaphragm vacuum gauge according to the first and second embodiments of the present disclosure.

The circuit units 11 and 11a described in the first and second embodiments can be implemented as a computer that includes a central processing unit (CPU), a storage device, and an interface, and a program that controls these hardware resources. FIG. 12 illustrates an example configuration of this computer.

The computer includes a CPU 200, a storage device 201, and an interface device (I/F) 202. To the I/F 202, for example, the hardware part of the capacitance detection unit 12 or 12a and the hardware part of the heater driving unit 15 are connected. In the computer thus configured, a program for implementing the method of the present disclosure is stored in the storage device 201. The CPU 200 performs the processes described in the first and second embodiments in accordance with the program stored in the storage device 201.

The present disclosure is applicable to diaphragm vacuum gauges.

What is claimed is:

1. A diaphragm vacuum gauge, comprising:
   a sensor chip including a first electrode provided on a base and a second electrode provided on a diaphragm so as to face the first electrode, the diaphragm and the base being disposed with a gap therebetween, and configured such that a distance between the first electrode and the second electrode changes in accordance with displacement of the diaphragm caused by pressure of a measurement target medium;
   a first operational amplifier configured to convert a current output from the first electrode to a voltage and amplify the voltage; and
   a coaxial cable configured to connect the first electrode and the first operational amplifier with each other, wherein
   the first electrode is connected to a virtual ground of the first operational amplifier by a core wire of the coaxial cable.

2. The diaphragm vacuum gauge according to claim 1, wherein
   a shield wire of the coaxial cable is connected to a ground of a circuit unit that includes the first operational amplifier.

3. The diaphragm vacuum gauge according to claim 1, further comprising:
   a first coaxial connector provided in a circuit unit including the first operational amplifier, and having a center contact that is connected to the virtual ground of the first operational amplifier; and
   a second coaxial connector attached to a second end of the coaxial cable having a first end that is connected to the first electrode, and having a center contact that is connected to a second end of the core wire of the coaxial cable, wherein
   the first coaxial connector and the second coaxial connector are coupled to each other to thereby connect the first electrode and the virtual ground of the first operational amplifier with each other.

4. The diaphragm vacuum gauge according to claim 1, further comprising:
   a second operational amplifier configured to apply a sensor driving signal to the second electrode; and
   a cable configured to connect an output terminal of the second operational amplifier and the second electrode with each other.

5. The diaphragm vacuum gauge according to claim 1, further comprising:

a capacitance calculation unit configured to calculate a value of a capacitance between the first electrode and the second electrode on the basis of an output signal of the first operational amplifier; and
a pressure measurement unit configured to convert the capacitance to a pressure measurement value.

6. A diaphragm vacuum gauge, comprising:
a sensor chip including a first electrode provided on a base, a second electrode provided on a diaphragm so as to face the first electrode, the diaphragm and the base being disposed with a gap therebetween, a third electrode provided outside the first electrode on the base, and a fourth electrode provided outside the second electrode on the diaphragm so as to face the third electrode, and configured such that a distance between the first electrode and the second electrode changes in accordance with displacement of the diaphragm caused by pressure of a measurement target medium;
a first operational amplifier configured to convert a current output from the first electrode to a voltage and amplify the voltage;
a second operational amplifier configured to convert a current output from the third electrode to a voltage and amplify the voltage;
a first coaxial cable configured to connect the first electrode and the first operational amplifier with each other; and
a second coaxial cable configured to connect the third electrode and the second operational amplifier with each other, wherein
the first electrode is connected to a virtual ground of the first operational amplifier by a core wire of the first coaxial cable, and the third electrode is connected to a virtual ground of the second operational amplifier by a core wire of the second coaxial cable.

7. The diaphragm vacuum gauge according to claim 6, wherein
a shield wire of the first coaxial cable and a shield wire of the second coaxial cable are connected to a ground of a circuit unit that includes the first operational amplifier and the second operational amplifier.

8. The diaphragm vacuum gauge according to claim 6, further comprising:
a first coaxial connector provided in a circuit unit including the first operational amplifier and the second operational amplifier, and having a center contact that is connected to the virtual ground of the first operational amplifier;
a second coaxial connector attached to a second end of the first coaxial cable having a first end that is connected to the first electrode, and having a center contact that is connected to a second end of the core wire of the first coaxial cable;
a third coaxial connector provided in the circuit unit including the first operational amplifier and the second operational amplifier, and having a center contact that is connected to the virtual ground of the second operational amplifier; and
a fourth coaxial connector attached to a second end of the second coaxial cable having a first end that is connected to the third electrode, and having a center contact that is connected to a second end of the core wire of the second coaxial cable, wherein
the first coaxial connector and the second coaxial connector are coupled to each other to thereby connect the first electrode and the virtual ground of the first operational amplifier with each other, and the third coaxial connector and the fourth coaxial connector are coupled to each other to thereby connect the third electrode and the virtual ground of the second operational amplifier with each other.

9. The diaphragm vacuum gauge according to claim 6, further comprising:
a third operational amplifier configured to apply a sensor driving signal to the second electrode and to the fourth electrode; and
a cable configured to connect an output terminal of the third operational amplifier with the second electrode and with the fourth electrode.

10. The diaphragm vacuum gauge according to claim 6, further comprising:
a subtracter configured to subtract an output signal of the second operational amplifier from an output signal of the first operational amplifier;
a capacitance calculation unit configured to calculate a value of a first capacitance between the first electrode and the second electrode on the basis of the output signal of the first operational amplifier;
a capacitance difference calculation unit configured to calculate a value obtained by subtracting a second capacitance between the third electrode and the fourth electrode from the first capacitance on the basis of an output signal of the subtracter;
a capacitance correction unit configured to correct the first capacitance with the second capacitance on the basis of a result of calculation by the capacitance calculation unit and a result of calculation by the capacitance difference calculation unit; and
a pressure measurement unit configured to convert the corrected first capacitance to a pressure measurement value.

11. The diaphragm vacuum gauge according to claim 6, wherein
the second electrode and the fourth electrode are electrically connected to each other to form a single electrode.

* * * * *